United States Patent Office 3,485,811
Patented Dec. 23, 1969

3,485,811
PROCESS AND CATALYST THEREFOR
Eli Levine, Hillside, N.J., and Philip C. Reuther, Springdale, Conn., assignors to Celanese Corporation, New York, N.Y., a corporation of Delaware
No Drawing. Filed Oct. 5, 1966, Ser. No. 584,349
Int. Cl. C08f 1/62
U.S. Cl. 260—89.1                 16 Claims

ABSTRACT OF THE DISCLOSURE

A novel redox catalyst comprising an oxidant and arylphosphinic acids or water soluble salts thereof as the reductant and the use of this novel redox catalyst for the improved emulsion polymerization of a monomer charge containing at least one polymerizable monoethylenically unsaturated monomer in an aqueous medium containing an emulsifying agent.

---

This invention relates to novel redox catalyst systems which are especially useful in aqueous emulsion polymerization reactions.

More particularly, this invention relates to novel redox catalyst systems containing an arylphosphinic acid, e.g., benzenephosphinic acid, or a water-soluble salt thereof, as the reductant, as well as to the use of such catalyst systems in the aqueous emulsion polymerization of ethylenically unsaturated monomers.

Many commercial aqueous emulsion polymers are prepared using a redox (oxidation-reduction) catalyst system. In a typical polymerization reaction of this type, the reductant reacts with the oxidant, and is itself oxidized, producing free radicals. The effect of these free radicals upon ethylenically unsaturated monomers is to activate or "energize" the centers of unsaturation in a small fraction of the total monomer in the system, and to react with these "energized" monomer molecules to yield larger free radicals. This process is repeated again and again, at the expense of the unreacted monomer present, until a system of polymer particles, in stable aqueous suspension and substantially free of unreacted monomer, is obtained.

Where thermosetting polymers are desired, monomers containing cross linking or cross linkable moieties, e.g., hydroxyl, carboxyl, amino or amido groups, are generally employed, particularly in the case of the so-called "thermosetting acrylics," and the addition of a catalyst which will promote cross linking, generally an acid or an acid salt, which will be present during the initial polymerization reaction or introduced subsequently, together with heating at a temperature generally in excess of that employed during the initial polymerization reaction, is usually necessary to effectuate conversion of the thermosetting polymer to the thermoset (substantially insoluble and infusible) state.

A wide variety of redox catalyst systems are known. The most common of these comprise an oxidant such as an alkali metal persulfate together with a reductant such as an alkali metal or other metal sulfite, bisulufite, sulfide or sulfinate, a sulfinic acid, such as benzenesulfinic acid (as disclosed in U.S. Patent No. 2,519,135 to Jacobson), and the like.

Any of these conventional redox catalyst systems will catalyze the aqueous emulsion polymerization of ethylenically unsaturated monomers. Nevertheless, their usefulness is limited in many cases by one serious disadvantage, namely, the fact that the aforementioned reductants are usually unstable, and are highly susceptible to oxidation, including auto-oxidation, at the slightest exposure to air. As a result, coating compositions or other end products formulated from polymers containing residues of these reductants tend to deteriorate on standing, and thus exhibit poor stability and shelf-life. In addition, these conventional reductants can cause rusting or corrosion when polymers containing them are in contact with certain metals.

The present invention provides a solution to these problems. More particularly, it has now been discovered that arylphosphinic acids and water-soluble salts thereof are stable and substantially non-susceptible to auto-oxidation when combined wth conventional redox oxidants, and thus are especially useful in redox catalyst systems for the aqueous emulsion polymerization of ethylenically unsaturated monomers.

In addition to these desirable features, it has also been discovered, quite unexpectedly, that the arylphosphinic acids and salts thereof possess another valuable property when used as the reductant in redox catalyst systems for the aqueous emulsion polymerization of ethylenically unsaturated monomers containing certain cross linkable moieties, which still further enhances the utility of these reductants.

More particularly, the reductants of the present invention when heated in contact with polymers containing hydroxyl, carboxyl, amino or amido moieties, and the like, also serve to cross link said polymers, thereby giving emulsions containing higher molecular weight polymers which are useful as coating compositions (particularly where acrylic monomers have been used) without the use of any additional catalyst.

It is, therefore, an object of the present invention to provide novel redox catalyst systems.

It is also an object of the present invention to provide novel redox catalyst systems containing an arylphosphinic acid or a water-soluble salt thereof as the reductant, which systems are useful in the aqueous emulsion polymerization of ethylenically unsaturated monomers.

A further object of the present invention is to provide novel, stable equeous emulsions of thermosetting polymers.

These and other objects of the present invention will be discussed in greater detail hereinbelow.

The arylphosphinic acids employed in the novel redox catalyst systems of the present invention will generally contain from 6 to 12 carbon atoms, inclusive and will usually contain no more than 2 condensed rings. Included among these arylphosphinic acids are benzenephosphinic acid, p-toluenephosphinic acid, xylenephosphinic acid, $\alpha$-naphthalenephoshinic acid $\beta$-naphthalenephosphinic acid, diphenylphosphinic acid, and the like, with the first of these being preferred. Also included are the water soluble salts of these arylphosphinic acids, among which are the alkali metal, e.g., lithium, potassium or sodium, salts, ammonium salts, and the like.

The arylphosphinic acids are readily prepared by known methods, e.g., by reacting an arylhydrocarbon, e.g., benzene, with phosphorus trichloride to give the corresponding arylphosphorous dichloride, e.g., benzene phosphorous dichloride, which upon hydrolysis gives the corresponding arylphosphinic acid, e.g., benzenephosphinic acid.

These arylphosphinic acids and water soluble salts thereof are used together with conventional oxidants in the novel redox catalyst systems of the present invention. Among these oxidants are inorganic persulfates, including the alkali metal persulfates, e.g., sodium persulfate or potassium persulfate, and ammonium persulfate, peroxides and hydroperoxides such as hydrogen peroxide, acetyl peroxide, ascaridol, benzoyl peroxide, caprylyl peroxide, chlorobenzyl peroxide, coconut oil peroxide, hydroxyheptyl peroxide, dilauroyl peroxide, di-t-butyl peroxide, lauric peroxide, oleic peroxide, stearic peroxide, succinyl peroxide, urea peroxide, partially oxidized aldehydes having peroxide functionality, t-butyl hydroperoxide, sumene hydroperoxide or t-butyl perbenzoate, and the like, as well as mixtures thereof.

In these redox catalyst systems, the weight ratio of oxidant to arylphosphinic acid or arylphosphinic acid salt will generally range from about 0.5:1 to about 2:1, respectively, and preferably from about 0.7:1 to about 1.5:1, respectively. The amount of the redox catalyst system used in carrying out the aqueous emulsion polymerization will vary to a considerable extent depending on the monomer or monomers being polymerized, the other components of the system, the polymerization conditions, etc. In general, however, a catalytic amount of the redox catalyst system will be within the range of from about 0.15% to about 1%, and preferably from about 0.3% to about 0.6%, by weight, based on the total weight of monomers employed.

In carrying out the polymerization, the pH of the system will generally be maintained between about 2.5 and about 6.5, and preferably between about 4 and about 6, when hydrolyzable monomers and polymers, e.g., vinyl acetate, alkyl acrylates and methacrylates, and the like, are involved, and various buffers, e.g., sodium bicarbonate, tetrasodium pyrophosphate, tetrapotassium pyrophosphate, sodium carbonate, and the like, as well as mixtures thereof, can be used if needed whenever it is necessary to maintain the pH within the above-stated ranges.

When used in conventional emulsion polymerization procedures, the novel redox catalyst systems of the present invention will catalyze the polymerization of any of the ethylenically unsaturated monomers which can be polymerized by conventional redox or free radical systems. Generally, the monomer or monomers employed will be monoethylenically unsaturated, and a significant proportion of the monomer charge will comprise monomers containing a single $H_2C=C<$ group.

An illustrative but by no means exhaustive listing of such monomers includes styrene, substituted styrenes, e.g., side chain-substituted styrenes such as α-methylstyrene and α-ethylstyrene and ring-substituted styrenes such as o-methylstyrene, p-ethylstyrene, m-propylstyrene, 2,4-dimethylstyrene, and 2,5-diethylstyrene, alkyl acrylates and methacrylates, such as ethyl acrylate, propyl acrylate, butyl acrylate, 2-ethylhexylacrylate, methyl methacrylate, ethyl methacrylate and isobutyl methacrylate, aliphatic vinyl esters such as vinyl formate, vinyl acetate, vinyl propionate, vinyl butyrate and the vinyl ester of versatic acid, aliphatic vinyl ethers such as methyl vinyl ether, ethyl vinyl ether and n-butyl vinyl ether, vinyl ketones such as methyl vinyl ketone, ethyl vinyl ketone and isobutyl vinyl ketone, vinyl halides such as vinyl fluoride, vinyl chloride and vinyl bromide, nitriles such as acrylonitrile and methacrylonitrile, allyl esters of saturated (which includes polymerizably non-reactive unsaturation) monocarboxylic acids such as allyl acetate, allyl propionate and allyl lactate, and alkyl diesters of monoethylenically unsaturated dicarboxylic acids such as diethyl maleate, dibutyl maleate, dioctyl maleate, diisooctyl maleate, dinonyl maleate, diisodecyl maleate, ditridecyl maleate, dipropyl fumarate, dibutyl fumarate, dioctyl fumarate, diiso-octyl fumarate, didecyl fumarate, dibutyl itaconate and dioctyl itaconate.

As previously indicated, the inclusion of monomers containing cross linkable moieties, such as hydroxyl, carboxyl, amino and amido groups, together with other monomers to be polymerized using the novel redox catalyst system of the present invention results in cross linkable polymers which can be converted to cross linked materials without the use of any additional catalyst. Such monomers include unsaturated amides such as acrylamide and methacrylamide, as well as derivatives thereof, e.g., methylolated amides such as N-methylolacrylamide and N-methylolmethacrylamide and alkylated methylolated amides such as N-methoxymethylacrylamide, N-butoxymethylacrylamide and N-methoxymethylmethacrylamide, α,β-monoethylenically unsaturated monocarboxylic acids such as acrylic acid, methacrylic acid, ethacrylic acid and α-chloroacrylic acid, hydroxy alkyl and amino alkyl esters of such acids, e.g., β-hydroxyethyl acrylate, β-hydroxyethyl methacrylate, β-hydroxyethyl α-chloroacrylate, β-hydroxypropyl acrylate, β-hydroxypropylmethacrylate, β-aminoethyl acrylate and β-aminoethylmethacrylate, and other α,β-monoethylenically unsaturated amino compounds such as thenylamine, and the like. Where a portion of the cross linkable monomer present contains carboxyl groups, there should also be present a sufficient amount of cross linkable monomer containing carboxyl-reactive groups, e.g., hydroxyl, amino or amido groups, to subsequently react with said carboxyl groups and provide cross linking.

The surfactants or emulsifying agents used in emulsion polymerization reactions which employ the novel redox catalyst systems of the present invention are the anionic, cationic and non-ionic materials, as well as mixtures thereof, conventionally used in the art for this purpose. Among these are polyethers, e.g., ethylene oxide and propylene oxide condensates in general, which include straight and branched-chain alkyl and alkylaryl polyethylene glycol and polypropylene glycol ethers and thioethers, and more particularly substances such as the "Igepals," which are members of a homologous series of alkylphenoxypoly(ethyleneoxy)ethanols, which series can be represented by the general formula

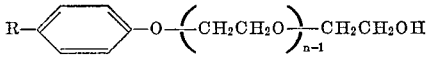

wherein R represents an alkyl radical and $n$ represents the number of mols of ethylene oxide employed, included among which are alkylphenoxypoly(ethyleneoxy) ethanols having alkyl groups containing from about 7 to about 18 carbon atoms, inclusive, and having from about 4 to about 100 ethyleneoxy units, such as the heptylphenoxypoly(ethyleneoxy) ethanols, nonylphenoxypoly (ethyleneoxy) ethanols and dodecylphenoxypoly(ethyleneoxy) ethanols; the sodium, potassium or ammonium salts of the sulfate esters of these alkylphenoxypoly(ethyleneoxy) ethanols; alkylpoly(ethyleneoxy) ethanols; alkylpoly(propyleneoxy) ethanols, octylphenoxyethoxyethyldimethylbenzylammonium chloride; polyethylene glycol t-dodecylthioether; the "Tweens," which are polyalkylene derivatives of hexitol (including sorbitans, sorbides, mannitans and mannides) anhydride partial long-chain fatty acid esters, such as the polyoxyalkylene derivatives of sorbitan monolaurate, sorbitan monopalmitate, sorbitan monostearate, sorbitan tristearate, sorbitan mono-oleate and sorbitan trioleate, and the "Pluronics," which are condensates of ethylene oxide with a hydrophobic base, formed by condensing propylene oxide with propylene glycol.

In addition, sodium and potassium alkyl, aryl and alkaryl sulfates and sulfonates, such as sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium methylbenzene sulfonate, potassium methylbenzene sulfonate, sodium dodecylbenzene sulfonate, potassium toluene sulfonate and sodium xylene sulfonate, dialkyl esters of sodium sulfosuccinic acid, such as sodium diamyl sulfosuccinate, sodium dihexyl sulfosuccinate and sodium dioctyl sulfosuccinate, and alkanol amides, e.g., mono- and disubstituted alkanol amides derived from fatty acids and mono- or dialkanol amines, and the like, can also be employed. Furthermore, mixtures of the aforementioned surfactants with each other or with other conventional surfactants can also be used, and in many cases are actually preferred.

The amount of surfactant or emulsifying agent employed will be that conventionally used by the art, and thus is not critical. For example, from about 2% to about 10% by weight, and preferably from about 3.5% to about 7.5% by weight, based on the total weight of monomers employed, can be used in most cases.

Protective colloids can also be used, especially when monomers such as vinyl acetate or the like are employed as at least part of the monomer charge. Included among such materials are ether linkage-containing materials such as hydroxymethyl cellulose, hydroxyethyl cellulose, ethyl hydroxyethyl cellulose, ethoxylated starch derivatives, and the like, as well as partially and fully hydrolyzed polyvinyl alcohols, natural and synthetic gums, such as gum tragacanth and gum arabic, polyacrylic acid, poly (methyl vinyl ether/maleic anhydride), and the like. All of these materials, if used, will also be used in the amounts employed in conventional emulsion polymerization procedures, i.e., generally from about 0.1% to about 2% by weight, based on the total weight of the emulsion.

The various constituents of the emulsion polymerization reaction medium, i.e., monomers, redox catlayst components, emulsifying agent, protective colloid (if used) and water, can be admixed and polymerized in one batch, or incremental addition of one or more of these materials can be practiced while still maintaining an essentially batch process, or a continuous polymerization process can be carried out. In any case, the polymerization temperature will generally range from about 20° C. to about 80° C. and preferably from 50° C. to about 70° C. Subatmospheric, atmospheric or superatmospheric pressures can be employed during all or part of the polymerization reaction, and the reaction time required under these temperatures and pressures will vary, depending on such factors as the monomer involved, the particular components chosen for the redox catalyst system, the percent conversion desired, and so forth.

Where the emulsion polymer produced contains cross linkable moieties, it can be cross linked, as indicated hereinabove, without the use of any additional catalyst. Thus, the emulsion in question, either as a film or in any other suitable shape or configuration, need merely be heated to an elevated temperature, i.e., generally in excess of about 120° C., with precise temperatures and times being dictated by the cross linkable moieties and redox catalyst systems involved, the form in which the emulsion polymer is being cross linked, e.g., the film thickness, etc.

In order that those skilled in the art can more fully understand the present invention, the following examples are set forth. These examples are given solely for the purpose of illustrating the invention, and should not be considered as expressing limitations unless so set forth in the appended claims. All parts and percentages are by weight, unless otherwise stated.

EXAMPLE I

A mixture of—

| Component: | Parts |
| --- | --- |
| Methyl methacrylate | 55.3 |
| Ethyl acrylate | 112.0 |
| Triton X-405 | 57.3 |
| Igepal CO-630 | 6.7 |
| Sodium persulfate | 2.5 |
| Benzenephosphinic acid | 3.5 | was dispersed in 435.0 parts of deionized water contained in a polymerization reactor, then sparged with nitrogen gas for 20 minutes at a moderate rate under mild agitation.

Next, the reaction mixture was heated, with stirring, to 55° C., at which point a pre-emulsion prepared by admixing—

| Component: | Parts |
| --- | --- |
| Methyl methacrylate | 497.7 |
| Ethyl acrylate | 1008.0 |
| Triton X-405 | 42.3 |
| Igepal CO-630 | 4.7 |
| Benzenephosphinic acid | 3.5 |
| Deionized water | 515.0 | under agitation at room temperature, and a solution of 2.5 parts of sodium persulfate in 150 parts of deionized water, were added simultaneously to the stirred contents of the reactor, the former over a 3 hour and 30 minute period and the latter over a 3 hour and 40 minute period, with the temperature being maintained at 62–65° C. during this time.

Two hours and 40 minutes after the start of these delayed additions, a solution of 37.1 parts of Triton X-405 and 6.3 parts of Igepal CO-630 in 20 parts of deionized water was added to the reactor over a 5 minute period.

Once the last of the sodium persulfate solution had been added, the temperature of the reaction mixture was raised to 80° C. and held there for 30 minutes. The resulting emulsion after being cooled to room temperature and adjusted to a pH of 7.5 with a mixture of 10 parts of an aqueous 28% ammonium hydroxide solution and 40 parts of deionized water, was suitable for use in coating compositions.

EXAMPLES II–V

The procedure of Example I was repeated in these examples in every detail but one, namely, the benzenephosphinic acid was replaced by an equivalent amount of toluenephosphinic acid, xylenephosphinic acid and the sodium and potassium salts of benzenephosphinic acid, respectively. In each case, a polymer emulsion suitable for use in coating compositions was obtained.

EXAMPLES VI–IX

The procedure of Example I was again repeated in these examples, with the following exceptions. In Example VI, the weight ratio of sodium persulfate to benzenephosphinic acid was 1:1. In Example VII, this weight ratio was 1.5:1, respectively. In Example VIII, the sodium persulfate was replaced by an equivalent amount of potassium persulfate. In Example IX, the sodium persulfate was replaced by an equivalent amount of ammonium persulfate, and the weight ratio of this oxidant to benzenephosphinic acid was adjusted to 1.5:1, respectively. In each case, a polymer emulsion suitable for use in coating compositions was obtained.

EXAMPLE X

A mixture of—

| Component: | Parts |
| --- | --- |
| Methyl methacrylate | 79.5 |
| Ethyl acrylate | 52.5 |
| Triton X-405 (alkylaryl polyether alcohol containing an average of 40 mols of ethylene oxide), 70% non-volatiles (Rohm & Haas Company) | 101.4 |
| Igepal CO-630 (nonylphenoxypoly (ethyleneoxy) ethanol) (Antara Chemicals) | 7.8 |
| Sodium bicarbonate (buffer) | 3.4 |
| Sodium persulfate | 1.5 |
| Benzenephosphinic acid | 3.0 | was dispersed in 780.0 parts of deionized water contained in a polymerization reactor, then sparged with nitrogen gas for 20 minutes at a moderate rate under mild agitation.

Next, the reaction mixture was heated, with stirring, to 55° C., at which point, a pre-emulsion prepared by admixing—

| Component: | Parts |
|---|---|
| Methyl methacrylate | 715.5 |
| Ethyl acrylate | 472.5 |
| N-methylolacrylamide (aqueous 60% solution) | 45.0 |
| Triton X–405 | 33.6 |
| Igepal CO–630 | 2.7 |
| Deionized water | 420.0 | under agitation at room temperature, a solution of 1.5 parts of sodium persulfate in 150 parts of water and a solution of 2.0 parts of sodium bicarbonate and 3.0 parts of benzenephosphinic acid in 150 parts of water were all added simultaneously to the stirred contents of the reactor over a four hour period, with the temperature being maintained at 60–62° C. during this time.

Once these additions were completed, the temperature of the reaction mixtxure was raised to 65° C. and held there for 30 minutes. The resulting emulsion, after being cooled to room temperature and filtered, had the following characteristics:

| | |
|---|---|
| Viscosity (Brookfield viscometer, #3 spindle, 20 r.p.m.) cps | 420 |
| Solids percent | 47.9 |
| Unreacted monomer do | <0.1 |

EXAMPLE XI

The procedure of Example X was repeated in every detail except for the following. A total of 2.7 grams of sodium bicarbonate was employed, and of this amount 1.4 grams were added initially and 1.3 grams were added with the delayed benzenephosphinic acid solution. The emulsion obtained had the following characteristics:

| | |
|---|---|
| Viscosity (Brookfield viscometer, #1 spindle, 20, r.p.m.) cps | 90 |
| Solids | 47.5 |
| Unreacted monomer percent | <0.1 |
| pH | 2.15 |

It will be obvious to those skilled in the art that other changes and variations can be made in carrying out the present invention without departing from the spirit and scope thereof as defined in the appended claims.

We claim:

1. A redox catalyst comprising an oxidant selected from the group consisting of inorganic persulfates, peroxides and hydroperoxides and as the reductant, a compound selected from the group consisting of arylphosphinic acids and water soluble salts thereof, said reductant contains from 6 to 12 carbon atoms, inclusive and no more than two condensed rings, the weight ratio of said oxidant to said reductant ranges from about 0.5:1 to about 2:1 respectively.

2. The catalyst of claim 1 wherein the weight ratio of the oxidant to reductant ranges from about 0.7:1 to about 1.5:1, respectively.

3. The catalyst of claim 2 wherein the reductant is benzenephosphinic acid.

4. The catalyst of claim 2 wherein the reductant is a water-soluble salt of benzenephosphinic acid.

5. The catalyst of claim 2 wherein the oxidant is an alkali metal persulfate.

6. The catalyst of claim 2 wherein the oxidant is sodium persulfate.

7. In a process for the emulsion polymerization of a monomer charge containing at least one polymerizable, monoethylenically unsaturated monomer in an aqueous medium containing an emulsifying agent, the improvement which comprises carrying out said process using a redox catalyst comprising an oxidant selected from the group consisting of inorganic persulfates, peroxides and hydroperoxides and as the reductant, a compound selected from the group consisting of arylphosphinic acids and water soluble salts thereof, said reductant contains from 6 to 12 carbon atoms, inclusive and no more than two condensed rings, the weight ratio of said oxidant to said reductant ranges from about 0.5:1 to about 2:1, respectively.

8. The process of claim 7 wherein the weight ratio of the oxidant to the reductant ranges from about 0.7:1 to about 1.5:1, respectively.

9. The process of claim 8 wherein said reductant is benzenephosphinic acid.

10. The process of claim 8 wherein said reductant is a water-soluble salt of benzenephosphinic acid.

11. The process of claim 8 wherein said oxidant is an alkali metal persulfate.

12. The process of claim 8 wherein said oxidant is sodium persulfate.

13. The process of claim 8 wherein at least part of said monomer charge is vinyl acetate.

14. The process of claim 8 wherein at least part of said monomer charge is an alkyl acrylate or methacrylate.

15. The process of claim 8 wherein at least part of said monomer charge is a cross linkable monomer.

16. The process of claim 8 wherein at least part of said monomer charge is N-methylolacrylamide.

References Cited

UNITED STATES PATENTS

| | | |
|---|---|---|
| 3,026,308 | 3/1962 | Kearney. |
| 3,117,108 | 1/1964 | Calvete. |
| 3,244,767 | 4/1966 | Nixon 252—435 |

OTHER REFERENCES

Kolesnikov et al., Chem. ABS., 62 (1965) p. 9318e.

Columbian Carbon Co., Chem ABS., 65 (August, 1966) pp. 7382h to 7382a.

HARRY WONG, JR., Primary Examiner

U.S. Cl. X.R.

252—426, 328, 435; 260—63, 78.4, 80, 80.3, 85.5, 86.1, 87.5, 88.1, 88.7, 89.5, 91.1, 92.1, 93.5